US 12,252,126 B2

(12) United States Patent
Boydston

(10) Patent No.: US 12,252,126 B2
(45) Date of Patent: Mar. 18, 2025

(54) LATERAL SAFETY AREA

(71) Applicant: Zoox, Inc., Foster City, CA (US)

(72) Inventor: Jacob Daniel Boydston, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 140 days.

(21) Appl. No.: 17/124,220

(22) Filed: Dec. 16, 2020

(65) Prior Publication Data
US 2022/0185288 A1 Jun. 16, 2022

(51) Int. Cl.
*G06V 20/58* (2022.01)
*B60W 30/18* (2012.01)
*B60W 50/00* (2006.01)
*G06V 20/56* (2022.01)

(52) U.S. Cl.
CPC .. *B60W 30/18159* (2020.02); *B60W 50/0098* (2013.01); *G06V 20/58* (2022.01); *G06V 20/588* (2022.01); *B60W 2520/10* (2013.01); *B60W 2520/12* (2013.01); *B60W 2552/00* (2020.02); *B60W 2554/4044* (2020.02); *B60W 2720/10* (2013.01); *B60W 2720/12* (2013.01)

(58) Field of Classification Search
CPC ....... B60W 30/18159; B60W 50/0098; B60W 2552/00; B60W 2554/4044; B60W 2520/10; B60W 2520/12; B60W 2720/10; B60W 2720/12; G06V 20/58; G06V 20/588
USPC .......................................................... 701/23
See application file for complete search history.

(56) References Cited

U.S. PATENT DOCUMENTS

| | | | | |
|---|---|---|---|---|
| 10,384,676 | B2 * | 8/2019 | Watanabe | B60W 30/095 |
| 10,431,094 | B2 * | 10/2019 | Noda | G01C 21/26 |
| 10,992,755 | B1 | 4/2021 | Tran | |
| 2017/0010618 | A1 | 1/2017 | Shashua et al. | |
| 2018/0148051 | A1 * | 5/2018 | Lujan | B60W 30/18154 |
| 2018/0233048 | A1 | 8/2018 | Andersson et al. | |
| 2019/0258251 | A1 | 8/2019 | Ditty et al. | |
| 2019/0384294 | A1 | 12/2019 | Shashua et al. | |
| 2020/0017102 | A1 * | 1/2020 | Gassmann | G01C 21/26 |
| 2020/0033859 | A1 * | 1/2020 | Xiao | G05D 1/0088 |
| 2022/0185330 | A1 | 6/2022 | Boydston et al. | |

(Continued)

FOREIGN PATENT DOCUMENTS

WO WO-2017030493 A1 * 2/2017 ............ B60Q 1/525
WO WO2017067729 A1 4/2017

OTHER PUBLICATIONS

"4 Types of Traffic Intersections that You Will Come Across in Different Countries", Feb. 21, 2019, Urbs (Year: 2019).*

(Continued)

*Primary Examiner* — Matthias S Weisfeld
(74) *Attorney, Agent, or Firm* — Lee & Hayes, P.C.

(57) ABSTRACT

Techniques for determining a safety area for a vehicle are discussed herein. In some cases, a first safety area can be based on a vehicle travelling through an environment and a second safety area can be based on a steering control or a velocity of the vehicle. A width of the safety areas can be updated based on a position of a bounding box associated with the vehicle. The position can be based on the vehicle traversing along a trajectory. Sensor data can be filtered based on the sensor data falling within the safety area(s).

19 Claims, 9 Drawing Sheets

(56) References Cited

U.S. PATENT DOCUMENTS

2022/0348226 A1* 11/2022 Bailey .................. B60W 10/04

OTHER PUBLICATIONS

International Search Report and Written Opinion for PCT Application No. PCT/US21/63236, mailed Mar. 31, 2022, 9 pgs.
Office Action for U.S. Appl. No. 17/124,237, mailed on Jul. 8, 2022, Boydston, "Determining Safety Area Based on Bounding Box", 7 Pages.

* cited by examiner

LATERAL SAFETY AREA

BACKGROUND

Vehicles can capture sensor data to detect objects in an environment. While the sensor data generally can be utilized to detect the objects, system limitations associated with processing of the sensor data may result in objects being undetected in rare occasions. For instance, sensor data captured before, or during, a turn by a vehicle associated with an object approaching a position associated with a trajectory of the vehicle may not be timely processed. Due to delays in processing the sensor data, detection of a potential collision and timely deployment of a safety measure may not be possible.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
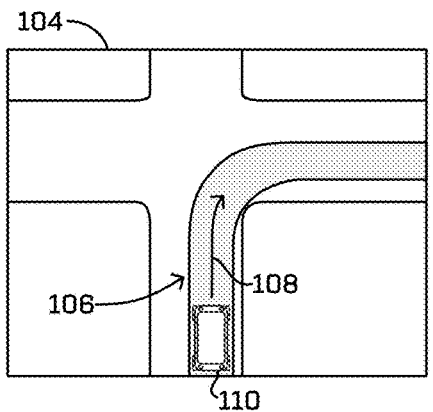
FIG. 1 is a pictorial flow diagram of an example process for determining a safety area based on a vehicle trajectory including a turn, in accordance with examples of the disclosure.
Figure 1:
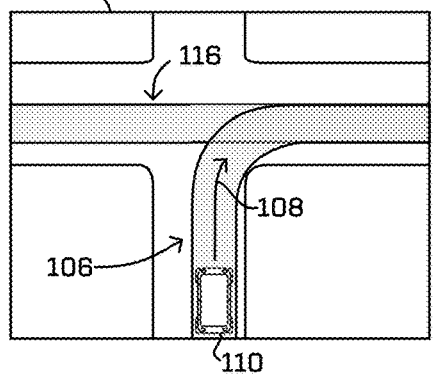
Figure 1:
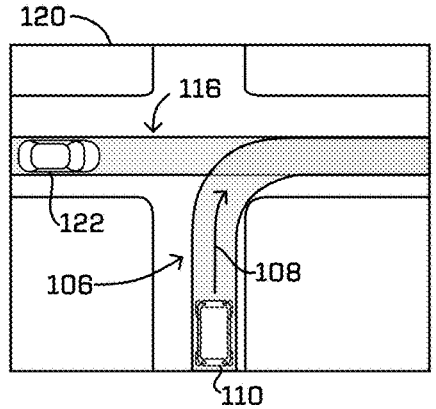
Figure 1:
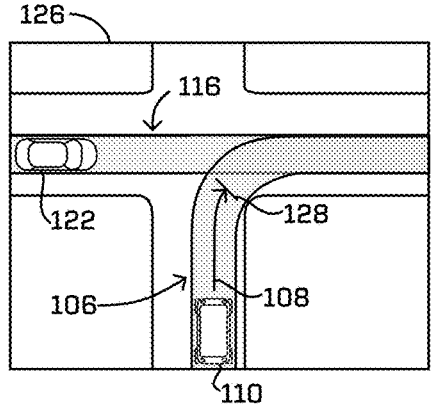

Techniques for determining safety regions for a vehicle are discussed herein. For example, techniques may include determining one or more safety regions based on a vehicle trajectory. In some cases, a safety area can be determined based on one or more of a direction of the trajectory (e.g., a left or right turn), a location, a maneuver to be performed, or a velocity of the trajectory. In some examples, the safety area(s) can include a first safety area generated as a constant width surrounding the trajectory and a second safety area based on a location (e.g., perpendicular to when going through an intersection) or based on a turn, maneuver, or velocity associated with the vehicle. In some examples, the safety area can be widened or otherwise updated based on projecting a motion of the vehicle along the trajectory and determining whether points associated with a bounding box fall outside of the safety area. Sensor data can be filtered based on the safety area(s) to reduce an amount of processing, while evaluating the sensor data for a potential collision with an object in the environment in a more accurate and reliable manner. Such safety regions may be used by a safety system associated with the vehicle. In such examples, available sensor (or other) data associated with regions outside of the safety area may filtered out to provide for heightened resources available to process data associated with the safety region.

As noted above, the first safety area can be determined based on a width associated with a received trajectory, while a second safety area can be determined based on aspects of the trajectory. For example, the second safety area can be determined to be near, and/or adjacent to, the vehicle (e.g., at a longitudinal end or a side of the vehicle). In some cases, the second safety area can be determined to be in front of the vehicle and perpendicular from the first safety area. In some cases, the second safety area can be determined to be parallel with the first safety area and adjacent to the vehicle. The vehicle can receive, and filter sensor data associated with an environment through which the vehicle is travelling. The sensor data can be filtered to determine sensor data associated with the first and/or second safety area. The filtered sensor data associated with the safety area(s) can be utilized to determine an object associated with the safety area(s) and determine any potential safety issues (e.g., collisions or otherwise) to invoke any safety actions (e.g., updating a maneuver, invoking an emergency stop, etc.).

The width of the portion(s) of each of the safety area(s) can be determined based on the information associated with the vehicle and/or the environment. The information can be utilized to determine a bounding box associated with the vehicle. In some examples, a width associated with a portion of a safety area (e.g., the first safety area) can be determined based on a bounding box (e.g., a bounding box associated with the vehicle). Further, a received trajectory can be discretized. One or more segments associated with a safety area (e.g., the first safety area or the second safety area) can be determined based on the trajectory being discretized. In some examples, segments of the safety area(s) can be determined based on the discretized segments associated with the trajectory. A width of each of the segment(s) can be determined based on a first width (e.g., a fixed width) or a second width based on a point associated with the bounding box and an edge of the segment. An extent of the any portion of the safety region may be determined based at least in part on speed limits, sensor ranges, previously observed objects in the area, and the like so as to limit the amount of processing performed in the safety system.

The techniques discussed herein can improve functioning of a computing device in a number of additional ways. In some cases, determining the safety area(s) can be utilized to decrease an amount of data required to be processed to avoid potential collision(s) in an environment. The second safety area can be determined based on the first safety area and the trajectory associated with the vehicle to determine the object with greater efficiency and accuracy. By utilizing the second safety area to filter the sensor data, resources can be conserved and/or reallocated for different tasks. The width(s) of the portion(s) of the safety area(s), instead of the entire safety area(s), can be analyzed to determine the potential collision and decrease an amount of data required to be analyzed. Resources utilized to control the vehicle can be conserved by determining the potential collision at an earlier time and by simplifying an amount and/or complexity of processing required to determine a modified acceleration profile.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configured to input data to determine movement associated with objects in an environment. Additionally, the techniques described herein can be used with real data (e.g., captured using sensor(s)), simulated data (e.g., generated by a simulator), or any third of the two.

FIG. 1 is a pictorial flow diagram 100 of an example process for determining a safety area based on a vehicle trajectory including a turn, in accordance with examples of the disclosure.

An operation 102 can include determining a safety area (e.g., a first safety area) based on a trajectory. The first safety area can be determined based on the trajectory associated with a vehicle travelling through an environment. In some examples, the first safety area can be determined based at least in part on a width and/or length of the vehicle, a current velocity of the vehicle and/or a velocity associated with the trajectory, and the like. In some examples, a maximum width of the first safety area can be a width of the vehicle and/or a lane in which the vehicle is currently situated. In some examples, a width of each portion of the first safety area can be a same width. In other examples, a width of each of one or more portions of the first safety area can be expanded based on a representation of the vehicle at a position along the first safety area at a future time. In some examples, the first safety area can be determined based on a fixed distance perpendicular from the trajectory. A center point of each cross-section of the first safety area can be at a same position as a point of the trajectory. The trajectory can be determined as being associated with a turn (e.g., a right turn) of the vehicle. The first safety area can be determined to be associated with a right turn based on the trajectory being associated with the right turn.

An example 104 illustrates an environment including a first safety area (e.g., a safety area 106) based on a trajectory 108. The safety area 106 can be determined based on the trajectory associated with a vehicle 110 travelling through the environment. In some examples, the safety area 106 can be determined based on a width and/or length of the vehicle 110, a current velocity of the vehicle 110 and/or a velocity associated with the trajectory 108, and the like. A width of each portion of the safety area 106 can be a same width. A center point of each cross-section of the safety area 106 can be at a same position as a point of the trajectory 108. The trajectory 108 can be determined as being associated with a turn (e.g., a right turn) of the vehicle 110. The safety area 106 can be determined to be associated with a right turn based on the trajectory 108 being associated with the right turn. In some examples, a distance of a width of the safety area 106 can be a same distance as for a width of the vehicle 110. In some examples, a distance of a width of the safety area 106 can be greater than, or less than, a distance of a width of the vehicle 110 by a threshold distance.

An operation 112 can include determining a safety area (e.g., a second safety area) based on the trajectory. The second safety area can be determined based on the trajectory being associated with the turn (e.g., the right turn). In some examples, the second safety area can be determined based at least in part on a portion of the safety area being associated with the vehicle being controlled to turn. In some examples, the second safety area can be determined based on the turn (e.g., a turning angle associated with the turn) in the environment meeting or exceeding a threshold turning angle. The second safety area can be determined based on the information associated with the environment and/or the vehicle. In some examples, the second safety area can be determined based on a distance between the vehicle and an intersection (e.g., a line associated with, in parallel with, and overlapping with, a boundary of a cross-street that is nearest to the vehicle) falling below a threshold distance and/or based on a velocity of the vehicle falling below a threshold velocity. In some examples, a maximum width of the second safety area can be a width of an intersecting lane perpendicular from a lane in which the vehicle is currently situated. Additional examples of the second safety area are discussed throughout this disclosure.

In some examples, an orientation of the second safety area can be based on an orientation of the first safety area. For example, the orientation of the second safety area can be determined based on a line tangent to a portion of the first safety area. The second safety area can be substantially perpendicular to the first safety area. In some cases, the second safety area can abut (e.g., touch) the vehicle. For example, a position of a portion of a boundary of the second safety area on a side of the vehicle can be associated with a position of a portion of a longitudinal end of the vehicle (e.g., a longitudinal end closest to a position toward which the vehicle is being controlled to move). In some examples, the portion of the longitudinal end of the vehicle can be a portion on a component (e.g., bumper) of the vehicle. The portion of the boundary (e.g., a near-side boundary (e.g., a boundary at a side of the second safety area closest to the portion of the longitudinal end)) can be a closest point of the boundary to the vehicle. The portion of the longitudinal end of the vehicle can be a closest point of the longitudinal end from the boundary.

In some cases, the second safety area can be spaced apart from (e.g., to not abut) the longitudinal end of the vehicle. For example, a distance between the second safety area and the longitudinal end can be determined to be equal to, or greater than a threshold distance (e.g., 1 meter, 10 meters, 30 meters, 100 centimeters, etc.). In some cases, the near-side boundary of the second safety area and can be determined to be in front of the longitudinal end of the vehicle. In some cases, the near-side boundary can be determined to be inside of the vehicle.

In some examples, the second safety area is fixed relative to the vehicle such that a position of the second safety area is updated as the vehicle traverses an environment. In some examples, the distance between the second safety area and the vehicle can vary (e.g., the distance can decrease as a distance between the vehicle and an intersection falls below a threshold distance, or as a velocity of the vehicle falls below a threshold velocity).

In some examples, because the first safety area can be determined based on a trajectory, the first safety area can be considered to be a drivable area. However, in some examples, the second safety area may include non-drivable surfaces such as sidewalks, buildings, etc., although the second safety area may include drivable surfaces as well.

An example 114 illustrates a second safety area (e.g., a safety area 116) based on the trajectory. The safety area 116 can be determined based on the trajectory being associated with the turn (e.g., the right turn). In some examples, the safety area 116 can be determined based on the turn (e.g., a turning angle associated with the turn) in the environment meeting or exceeding a threshold turning angle. In some examples, a maximum width of the safety area 116 can be a width of an intersecting lane perpendicular from a lane in which the vehicle 110 is currently situated.

In various examples discussed herein, such a second safety area may be limited based at least in part on map data available to the vehicle. In such examples, widths, lengths, or other extents may be bounded based on geometric data associated with the map and/or parameters associated therewith (e.g., speed limits, crosswalks, etc.).

An operation 118 can include determining that the object is associated with the second safety area. In some cases, the object can be determined based on sensor data received from one or more sensors of the vehicle. For example, the sensor data can include data from multiple types of sensors on the vehicle, such as Light Detection and Ranging (LIDAR) sensors, RADAR sensors, image sensors, depth sensors (time of flight, structured light, etc.), and the like. The sensor data utilized to determine the object in the environment can be filtered, as filtered sensor data (e.g., a subset of the sensor data). The subset of the sensor data can include data associated with the first safety area and/or the second safety area. The object can be determined as being associated with the first safety area and/or the second safety area, based on the subset of the sensor data. A likelihood that the object will intersect the trajectory (e.g., a likelihood of an intersection) can be determined based on the subset of the sensor data.

In some examples, a distance of a width of the safety area 116 can be a same distance as for a width of the vehicle 110. In some examples, a distance of a width of the safety area 116 can be greater than, or less than, a distance of a width of the vehicle 110 by a threshold distance. The distance of the width can be automatically set based on the width of the vehicle 110, and/or dynamically adjusted based on a size of a road that is overlapped and/or associated with the safety area 116. As discussed in connection with FIG. 2, a width of the safety area(s) can be widened up otherwise updated based on a simulated or projected motion of the vehicle along the trajectory.

An example 120 illustrates an object 122 associated with the second safety area (e.g., the safety area 116). In some cases, the object 122 can be determined based on sensor data received from one or more sensors of the vehicle. The sensor data utilized to determine the object 122 can be filtered, as filtered sensor data. The filtered sensor data can include data associated with the safety area 116. The object 122 can be determined as being associated with the safety area 116, based on the filtered sensor data.

In some examples, sensor data (e.g., lidar data points) associated with the safety area 106 can be fused with sensor data (e.g., lidar data points) associated with the safety area 116. For example, the sensor data (e.g., overlapping sensor data) that is associated with each of the safety area 106 and the safety area 116, can be processed once and utilized for each of the safety area 106 and the safety area 116. Instead of processing the overlapping sensor data twice, once for each of the safety area 106 and the safety area 116, half of the processing can be eliminated. By processing and/or analyzing the overlapping sensor data once for both the safety area 106 and the safety area 116, computational resources can be conserved and/or optimized.

An operation 124 can include controlling the vehicle based on the object. For example, the vehicle can be controlled based on the likelihood that the object will intersect the trajectory of the vehicle. In some examples, the vehicle can be controlled to decelerate (e.g., slow down) and/or to stop. The vehicle can be controlled by modifying one or more of an acceleration or steering command to reduce the likelihood of intersection. The vehicle can be controlled to stop at a position associated with a distance between the vehicle and the object above a threshold distance being maintained. For example, a velocity of the vehicle can be controlled to decrease (e.g., decrease to 10 miles per hour ("mph"), 5 mph, 0 mph, etc.). By controlling the vehicle to slow down, a potential collision between the vehicle and the object can be avoided, based on a distance between the vehicle and the object being determined to be greater than a threshold distance as the object moves within the environment (e.g., within the second safety area).

In some examples, the vehicle can be controlled to accelerate (e.g., speed up), based on the object. For example, a velocity of the vehicle can be controlled to increase (e.g., increase to 5 mph, 15 mph, 20 mph, etc.). By controlling the vehicle to speed up, a potential collision between the vehicle and the object can be avoided. The collision can be avoided based on the distance between the vehicle and the object being determined to be greater than a threshold distance, as the vehicle is controlled to turn and as the object moves within the environment. The vehicle can be controlled based on an option to accelerate or decelerate, based on a predicted likelihood of the potential collision associated with each option. The option determined to control the vehicle can be based on the predicted likelihood associated with the option being less than the predicted likelihood associated with the other option.

An example 126 illustrates the vehicle 110 being controlled based on the object 122. In some examples, the vehicle 110 can be controlled to one or more of decelerate, stop, and/or accelerate. The vehicle 110 can be controlled to stop at a position 128. In some examples, the vehicle 110 can be controlled to return to the trajectory 108, based on determining the object 122 exits the safety area 116. By analyzing sensor data associated with the safety area 116, the vehicle 110 can respond to the object 122 based on changes in movement of the object 122. The vehicle 110 can ignore detection of the object 122, based on the object exiting the safety area 116 prior to the vehicle 110 entering the safety area 116.

Therefore, and as described herein, multiple safety areas can be determined based on a trajectory associated with a vehicle. The safety areas can be utilized to more accurately determine an object moving within an environment through which the vehicle is travelling. One of the safety areas (e.g., a lateral safety area) can be perpendicular to the other safety area that is in parallel or colinear with the trajectory. The lateral safety area can be utilized to filter our sensor data. By filtering out the sensor data, the object can be determined quickly and accurately. The object can be determined as the vehicle approaches an intersection. The vehicle can be controlled to stop and avoid a potential collision with the obstacle. For example, the vehicle can be controlled to decelerate to slower velocity, to decelerate to a stop, to accelerate, and/or or to take another action (e.g., turn) to decrease a likelihood of a potential collision with the object.

Figure 2:
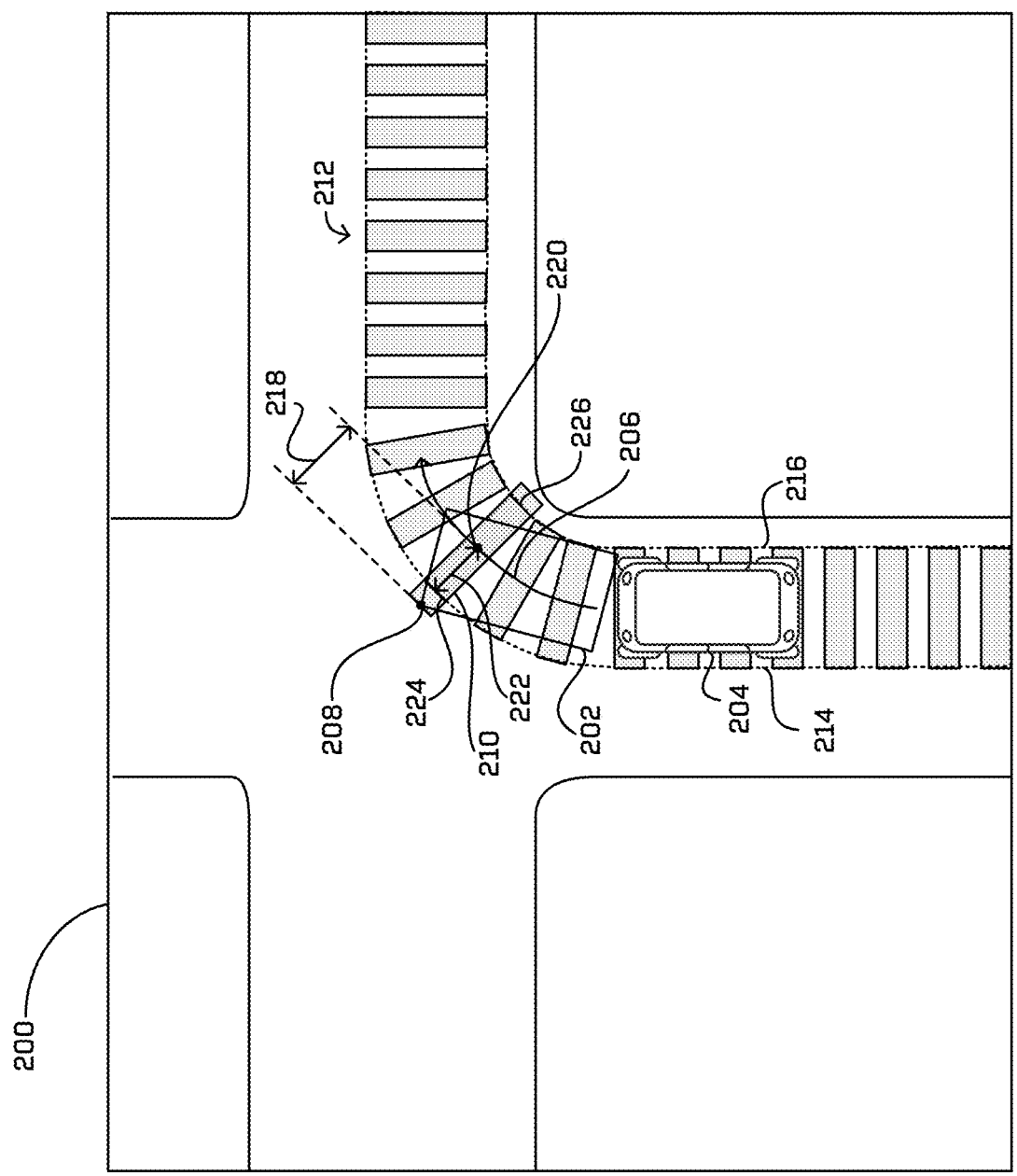
FIG. 2 is an environment including a portion of a safety area with a width determined based on an orientation of a bounding box associated with a vehicle, in accordance with examples of the disclosure.

FIG. 2 is an environment 200 including a portion of a safety area with a width determined based on an orientation of a bounding box associated with a vehicle, in accordance with examples of the disclosure.

In some examples, a position of a bounding box 202 associated with a vehicle 204 can be determined based on a trajectory 206 of the vehicle 204. The position of the bounding box 202 can be determined based on a simulation of the vehicle 204 traversing along the trajectory 206. The simulation can include the bounding box 202 being propagated along each portion of the trajectory 206. A longitudinal orientation of the bounding box 202 can be coincident (e.g., tangent) to the trajectory 206, as the bounding box 202 is propagated. The bounding box 202 can include, and/or be associated with, information such as a location, orientation, pose, and/or size (e.g., length, width, height, etc.) associated with the vehicle. The bounding box 202 can include one or more bounding box points (e.g., a bounding box point 208), with each of the bounding box point(s) being associated with a corner of the vehicle 204. The information can include a position associated with each point of the bounding box 202, for each position of the bounding box 202 traversing along the trajectory.

In some examples, the trajectory 206 can be discretized into segments, a plurality of segments (e.g., a segment 210) of the safety area 212 being associated with the segments of the trajectory 206. The position of the bounding box 202 along the trajectory 206 can be based on one of the segments of the discretized trajectory. A number of segments included in the plurality of segments of the safety area 212 is not limited and can include any number of segments. In some cases, a shape of each segment is a polygon (e.g., rectangle).

In some examples, a position of the bounding box 202 can be determined along the trajectory 306, the bounding box 202 representing the vehicle 204 at a future time. The position associated with the vehicle 204 along the safety area 212 can based on the simulation of the vehicle 204 traversing along the trajectory 206 at the future time;

In some examples, for each position of the bounding box traversing along the trajectory, distances can be determined for the bounding box points. For the position of the bounding box 202, distances from each bounding box point to the trajectory 206, and from the trajectory to a boundary (e.g., a boundary 214 or a boundary 216) of the safety area 212 can be determined. For example, for a position of the bounding box 202, a distance 218 between a first point (e.g., a bounding box point (e.g., the bounding box point 208)) and a second point (e.g., a closest point (e.g., a closest point 220) on a trajectory) can be determined. For each point of the bounding box 202, a distance 222 between the closest point 220 and an edge (e.g., an edge 224) of a segment (e.g., the segment 210) and/or the boundary (e.g., the closest boundary (e.g., the boundary 214)) can be determined.

In some examples, a difference between the distance 218 and the distance 222 can be determined. The distance 218 can be determined to meet or exceed the distance 222, based on the bounding box 202 having a wider turn radius at the bounding box point 208 than the trajectory 206 at the closest point 220. A width of the segment 210 subsequently can be updated to include the distance 218, based on the distance 218 meeting or exceeding the distance 222 (e.g., the distance 222 (e.g., a first distance) being less than, or equal to, the distance 218 (e.g., a second distance)). In some examples, the safety area 212 can be determined to have a portion associated with the segment 210, the portion including a width subsequently updated to include the distance 218.

In some examples, a width of the segment 210 can be updated based on distances associated with a different side (e.g., a right side and/or an interior side with respect to the turn) of the segment 210. For example, a distance between a bounding box point associated with the different side and the closest point 220 can be determined. A distance between the closest point 220 and an edge (e.g., an edge 226) associated with the different side of the segment and/or the boundary 216 can be determined. The width of the segment 210 subsequently can be updated to include the distance between the bounding box point associated with the different side and the closest point 220, based on the distance between the bounding box point meeting or exceeding the distance between the closest point 220 and the edge 226.

The features described above with respect to FIG. 2 are not limited thereto and can be implemented in conjunction with any of the features described above with respect to FIG. 1. For example, any of the features described above with respect to FIG. 2 can be implemented in conjunction with any of the features described above with respect to FIG. 1. By combining features described above with respect to both FIGS. 1 and 2, the vehicle can be controlled with greater accuracy and safety. For example, the updated safety area width of FIG. 2 can be utilized along with the second safety area of FIG. 2 to control the vehicle to prevent the potential collision.

Figure 3:
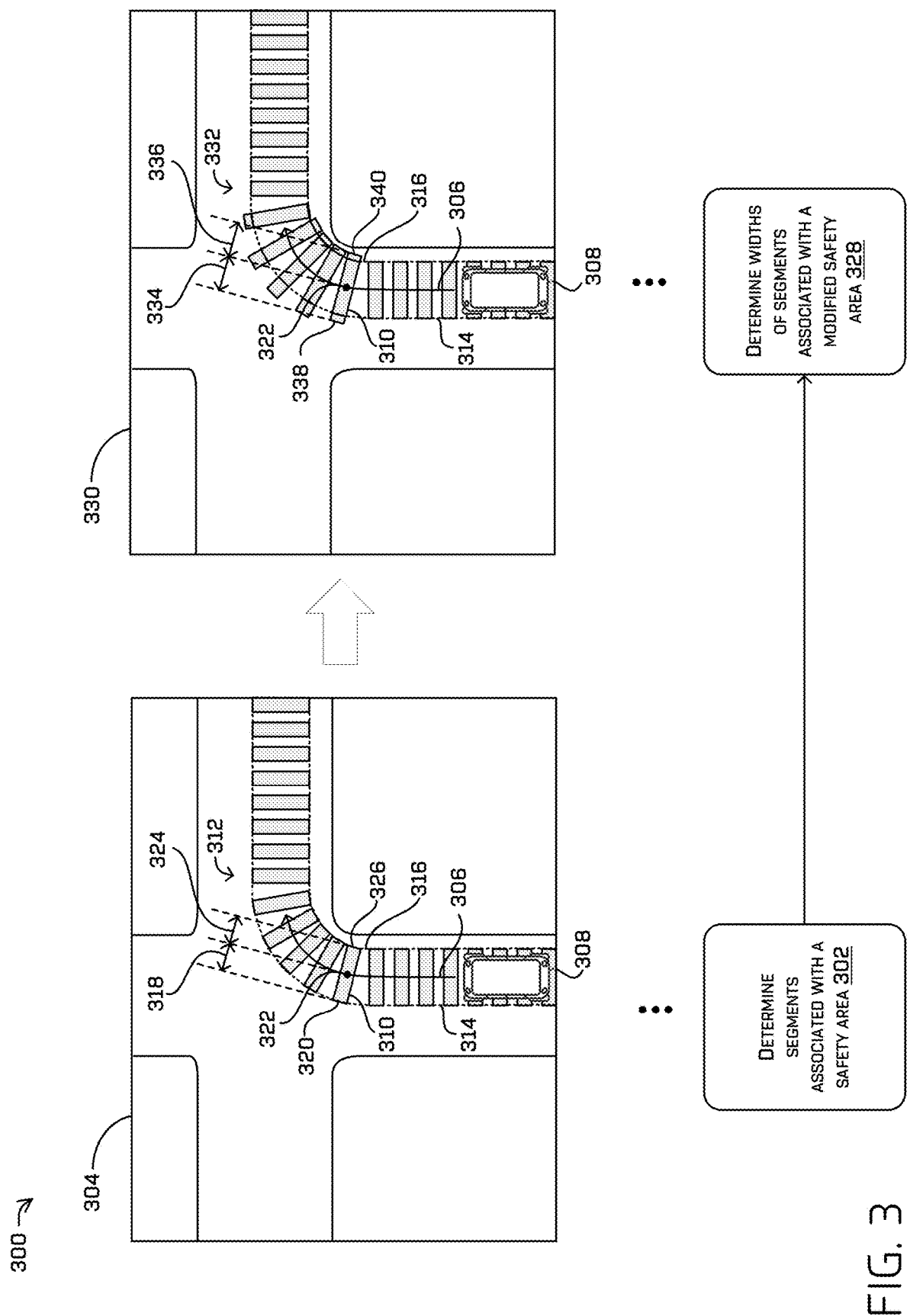
FIG. 3 is a pictorial flow diagram of an example process for determining segments of a safety area based on a bounding box associated with a vehicle, in accordance with examples of the disclosure.

FIG. 3 is a pictorial flow diagram 300 of an example process for determining segments of a safety area based on a bounding box associated with a vehicle, in accordance with examples of the disclosure.

An operation 302 can include determining segments associated with a safety area. In some examples, a trajectory associated with a vehicle can be discretized into a plurality of segments associated with a safety area. The safety area can have a boundary at an outside of a turn and a boundary at an inside of a turn. A position of a bounding box associated with the vehicle can be determined based on each of the plurality of segments. The position of the bounding box can be determined along the trajectory. The safety area can include any number of segments. A number of the segments can be greater than a threshold number, such that the safety area determined based on the plurality of segments can be treated as being continuous. In some examples, a maximum width of the safety area can be a width of the vehicle and/or a lane in which the vehicle is currently situated.

An example 304 illustrates a trajectory 306 associated with a vehicle 308. The trajectory 306 can be discretized. A plurality of segments (e.g., a segment 310) associated with a safety area (e.g., a safety area 312) can be associated with segments of the discretized trajectory 306. For example, each of the segments can be associated with a portion of the first safety area. The safety area 312 can have a boundary 314 at an outside of a turn and a boundary 316 at an inside of a turn. A position of a bounding box associated with the vehicle 308 can be determined based on each of the segments of the discretized trajectory 306. The position of the bounding box can be determined along the trajectory 306.

In some examples, a width of each of the segments (e.g., the segment 310) can be determined based on a distance (e.g., a distance 318) of a first side of the segment and a distance of a second side (e.g., distance 324) of the segment. The distance 318 can be a distance between an edge (e.g., an edge 320)) of the segment and a closest point (e.g., a point 322) on the trajectory 306. For example, the distance 318 can be a length of a hypothetical line extending from the point 322 in a perpendicular direction and ending at the boundary 316. The distance 324 can be a distance between another edge (e.g., an edge 326) of the segment and the point on the trajectory 306. For example, the distance 324 can be a length of a hypothetical line extending from the point 322 in a perpendicular direction and ending at the edge 326. The point on the trajectory 306 associated with the segment can have a position at a center of the segment.

The width of each segment associated with the respective portion of the safety area can be a sum of the distance of the first side and the distance of the second side. For example, the width of the segment 310 can be a sum of the distance 318 and the distance 324. In some cases, the width of each of the segments can be a same width. However, the width is not limited as such and can vary based on various parameters. For example, the width of any of the segments associated with the respective portion of the safety area can be determined based on various types of information including, but not limited to, a velocity of the vehicle, a type of terrain of the road on which the vehicle is travelling, a type of weather, dimensions of road and/or lane, vehicle characteristics (e.g., type and/or age of tires or brakes), a speed limit of the road on which the vehicle is travelling or of a cross street, etc. The information utilized to determine the width can be real-time data or historical data associated with similar vehicles in similar circumstances. The trajectory 306 can be discretized into any number of segments associated with the safety area 312. For example, the number of segments can be any number (e.g., one, or a number on an order of tens, hundreds, thousands, etc.), including a number approaching infinity. A combination of the plurality of segments of the safety area 312 can be associated with the segments of the discretized trajectory 306 and can approach a continuous area.

An operation 328 can include determining a width of segments associated with an augmented safety area (e.g., a modified safety area). In some examples, a width of a segment can be determined based on a distance associated with a first side of the segment and another distance associated with a second side of the segment. Each of the distances associated with the first side and the second side can be determined to be a greater distance between a first distance and a second distance. The first distance can be associated with a boundary of the safety area and/or an edge of a segment associated with a portion of the safety area. For example, the first distance can be a distance between the closest point on the trajectory and an edge of a segment of the safety area, and/or a distance between the closest point and a boundary of a portion of the safety area. The second distance can be associated with a point on a simulated bounding box. For example, the second distance can be a distance between a point of the bounding box and the closest point. In some examples, a maximum width of the augmented safety area can be a width of the lane in which the vehicle is currently situated.

An example 330 illustrates widths of segments (e.g., segment 310) associated with an augmented safety area (e.g., a safety area 332). In some examples, a width of a segment 310 can be determined based on a distance (e.g., a distance 334) associated with a first side of the segment 310 and another distance (e.g., distance 336) associated with a second side of the segment 310. The width of each segment associated with the respective portion of the safety area can be a sum of the distance (e.g., the distance 334) of the first side and the distance (e.g., a distance 336) of the second side.

In some examples, a position associated with the vehicle 308 can be determined along the safety area 332 at a future time. A maximum distance of a point associated with a representation of the vehicle 308 at the future time from the trajectory 306 at the position can be determined. The representation of the vehicle can include a bounding box. A width of a portion of the safety area 332 (e.g. a portion of the safety area 332 associated with the segment 310) can be determined as the maximum distance at the position and utilized to control the vehicle 308. For example, the maximum distance can include a combination of the distance 334 and the distance 336. The width of the portion of the safety area 332 can be determined as the combination of the distance 334 and the distance 336.

In some examples, each of the distances associated with the first side and the second side can be determined to be a greater distance between the first distance and the second distance. The first distance used to determine the distance 334 can be associated with a current boundary (e.g., the boundary 314) of the current safety area and/or a current edge of a segment associated with a portion of the safety area. For example, the first distance used to determine the distance 334 can be a distance between the closest point (e.g., the point 322) and a current edge (e.g., an edge 320) of the segment 310, and/or a distance between the closest point (e.g., the point 322) and a current boundary (e.g., the boundary 314) of a portion of the current safety area 312. The second distance can be associated with a point on a simulated bounding box. In some examples, the second distance used to determine the distance 334 can be a distance between a point on the bounding box and the closest point on the trajectory (e.g., the point 322). The distance (e.g., the distance 334) associated with the first side of the segment (e.g., 310) can be determined to be the second distance, based on the second distance being greater than or equal to the first distance. The width of the segment 310 can be determined based on the distance (e.g., distance 334) associated with the first side being determined to be the second distance. Additionally or alternatively, the width of the portion of the safety area 332 can be determined based on the distance (e.g., distance 334) associated with the first side being determined to be the second distance.

In some examples, the first distance used to determine the distance 336 can be associated with a current boundary (e.g., the boundary 316) of the safety area (e.g., the safety area 312) and/or a current edge (e.g., the edge 326) of a segment associated with a portion of the safety area. For example, the first distance used to determine the distance 336 can be a distance between the closest point (e.g., the point 322) and a current edge (e.g., an edge 326) of the segment 310, and/or a distance between the closest point (e.g., the point 322) and a current boundary (e.g., the boundary 316) of a portion of the current safety area 312. The second distance used to determine the distance 336 can be a distance between a point on the bounding box and the closest point on the trajectory (e.g., the point 322). The distance (e.g., distance 336) associated with the first side of the segment (e.g., the segment 310) can be determined to be the second distance, based on the second distance being greater than the first distance. The width of the segment 310 can be determined based on the distance (e.g., the distance 336) associated with the second side being set as the second distance. Additionally or alternatively, the width of the portion of the safety area 332 can be determined based on the distance (e.g., the distance 336) associated with the first side being determined to be the second distance.

In some examples, the edge 338 can extend beyond the boundary 314, outside of the turn. An edge 340 can extend beyond the boundary 316, inside of the turn. The safety area 312 can have a variable width.

A subset of the sensor data can be determined based on the safety area 312 and/or the safety area 332. An object represented in the subset of the sensor data can be detected. A likelihood that the object will intersect the trajectory 306 (e.g., a likelihood of intersection) can be determined. The vehicle 308 can be controlled based on the likelihood. The features described above with respect to FIG. 3 are not limited thereto and can be implemented in conjunction with any of the features described above with respect to FIG. 1 or FIG. 2. For example, the vehicle 308 can be controlled by modifying one or more of an acceleration or steering command to reduce the likelihood of intersection.

Therefore, and as described herein, the trajectory associated with the vehicle can be discretized into segments. A plurality of segments of the safety area can be associated with the segments of the discretized trajectory. The segments and/or a portion of the safety area can have a width that is adjusted based on portions of the simulated bounding box associated with the vehicle. The width can be adjusted based on the portions of the simulated bounding box meeting, or extending beyond, the safety area. By adjusting the width, potential collisions with the vehicle and objects in the environment through which the vehicle is travelling can be more accurately predicted and avoided. A likelihood of a potential collision can be reduced at a greater level by adjusting a width of a portion of the safety area for vehicles that have lengths that are longer than an average length of a vehicle. For example, the likelihood of the potential collision can be reduced at a greater level by adjusting the width of the portion of the safety area for a large truck (e.g., semi-trailer truck).

Figure 4:
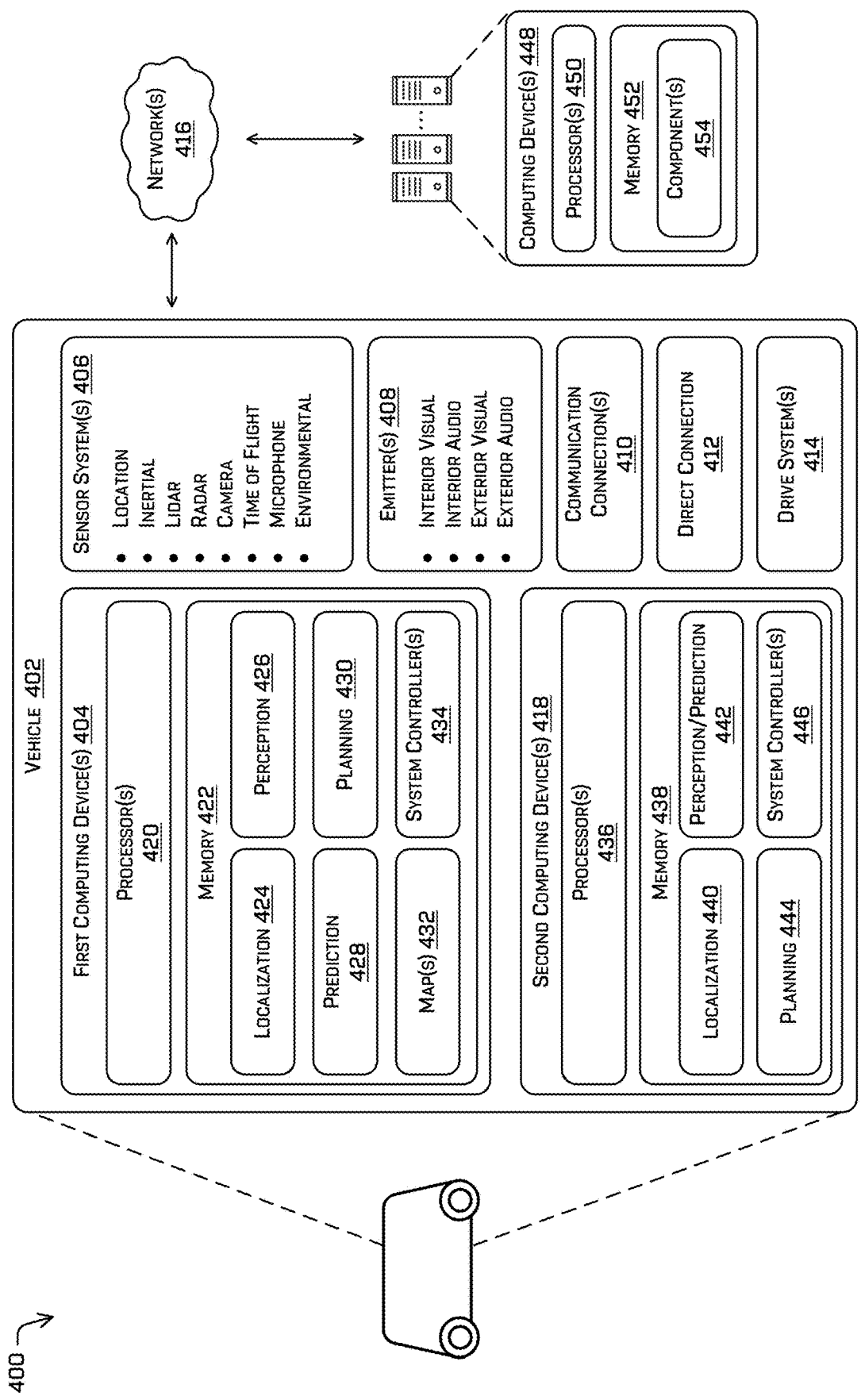
FIG. 4 depicts a block diagram of an example system for implementing the techniques described herein.

FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle. The vehicle 402 can be implemented as the vehicle in any of FIGS. 1-3 and 5-7.

The vehicle 402 can be a driverless vehicle, such as an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more first computing devices 404, one or more sensor systems 406, one or more emitters 408, one or more communication connections 410 (also referred to as communication devices and/or modems), at least one direct connection 412 (e.g., for physically coupling with the vehicle 402 to exchange data and/or to provide power), and one or more drive systems 414. The one or more sensor systems 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the first computing device(s) 404.

The vehicle 402 can also include emitter(s) 408 for emitting light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include communication connection(s) 410 that enable communication between the vehicle 402 and one or more other local or remote computing device(s) (e.g., a remote teleoperation computing device) or remote services. For instance, the communication connection(s) 410 can facilitate communication with other local computing device(s) on the vehicle 402 and/or the drive system(s) 414. Also, the communication connection(s) 410 can allow the vehicle 402 to communicate with other nearby computing device(s) (e.g., other nearby vehicles, traffic signals, etc.).

The communications connection(s) 410 can include physical and/or logical interfaces for connecting the first computing device(s) 404 to another computing device or one or more external networks 416 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 402 can include drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include the sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The vehicle 402 can include one or more second computing devices 418 to provide redundancy, error checking, and/or validation of determinations and/or commands determined by the first computing device(s) 404.

By way of example, the first computing device(s) 404 may be considered to be a primary system, while the second computing device(s) 418 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of the sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

The secondary system may implement any of the techniques of FIGS. 1-3 and 5-7, as described herein. For example, the secondary system may determine one or more safety areas utilized to control the vehicle. The secondary system may be a redundant backup system.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 404 can include one or more processors 420 and memory 422 communicatively coupled with the one or more processors 420. In the illustrated example, the memory 422 of the first computing device(s) 404 stores a localization component 424, a perception component 426, a prediction component 428, a planning component 430, a maps component 432, and one or more system controllers 434. Though depicted as residing in the memory 422 for illustrative purposes, it is contemplated that the localization component 424, the perception component 426, the prediction component 428, the planning component 430, the maps component 432, and the one or more system controllers 434 can additionally, or alternatively, be accessible to the first computing device(s) 404 (e.g., stored in a different component of vehicle 402 and/or be accessible to the vehicle 402 (e.g., stored remotely).

In memory 422 of the first computing device 404, the localization component 424 can include functionality to receive data from the sensor system(s) 406 to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory, as discussed herein.

The perception component 426 can include functionality to perform object detection, segmentation, and/or classification. In some examples, the perception component 426 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional or alternative examples, the perception component 426 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 426 can use perception algorithms to determine a perception based bounding box associated with an object in the environment based on sensor data. For example, the perception component 426 can receive image data and classify the image data to determine that an object is represented in the image data. Then, using detection algorithms, the perception component 426 can generate a two dimensional bounding box and/or a perception based three dimensional bounding box associated with the object. The perception component 426 can further generate a three dimensional bounding box associated with the object. As discussed above, the three dimensional bounding box can provide additional information such as a location, orientation, pose, and/or size (e.g., length, width, height, etc.) associated with the object.

The perception component 426 can include functionality to store perception data generated by the perception component 426. In some instances, the perception component 426 can determine a track corresponding to an object that has been classified as an object type. For purposes of illustration only, the perception component 426, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 402. Fused perception data can include a fusion or other combination of sensor data from sensor system(s) 406, such as image sensors, lidar sensors, radar sensors, time of flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 428 can generate one or more probability maps representing prediction probabilities of possible locations of one or more objects in an environment. For example, the prediction component 428 can generate one or more probability maps for vehicles, pedestrians, animals, and the like within a threshold distance from the vehicle 402. In some instances, the prediction component 428 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 430 can determine a path for the vehicle 402 to follow to traverse through an environment. For example, the planning component 430 can determine various routes and paths and various levels of detail. In some instances, the planning component 430 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 430 can generate an instruction for guiding the autonomous vehicle along at least a portion of the route from the first location to the second location. In at least one example, the planning component 430 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 430 can alternatively, or additionally, use data from the perception component 426 and/or the prediction component 428 to determine a path for the vehicle 402 to follow to traverse through an environment. For example, the planning component 430 can receive data from the perception component 426 and/or the prediction component 428 regarding objects associated with an environment. Using this data, the planning component 430 can determine a route to travel from a first location (e.g., a current location) to a second location (e.g., a target location) to avoid objects in an environment. In at least some examples, such a planning component 430 may determine there is no such collision free path and, in turn, provide a path which brings vehicle 402 to a safe stop avoiding all collisions and/or otherwise mitigating damage.

The memory 422 can further include one or more maps 432 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 432 can include at least one map (e.g., images and/or a mesh). In some examples, the vehicle 402 can be controlled based at least in part on the map(s) 432. That is, the map(s) 432 can be used in connection with the localization component 424, the perception component 426, the prediction component 428, and/or the planning component 430 to determine a location of the vehicle 402, identify objects in an environment, generate prediction probabilit(ies) associated with objects and/or the vehicle 402, and/or generate routes and/or trajectories to navigate within an environment.

In some examples, the one or more maps 432 can be stored on a remote computing device(s) (such as the computing device(s) 448) accessible via network(s) 416. In some examples, multiple maps 432 can be stored based on, for example, a characteristic (e.g., type of entity, time of day, day of week, season of the year, etc.). Storing multiple maps 432 can have similar memory requirements but can increase the speed at which data in a map can be accessed.

In at least one example, the first computing device(s) 404 can include one or more system controllers 434, which can be configured to control steering, propulsion, braking, safety, emitters, communication, and other systems of the vehicle 402. These system controller(s) 434 can communicate with and/or control corresponding systems of the drive system(s) 414 and/or other components of the vehicle 402, which may be configured to operate in accordance with a path provided from the planning component 430.

The second computing device(s) 418 can comprise one or more processors 436 and memory 438 including components to verify and/or control aspects of the vehicle 402, as discussed herein. In at least one instance, the one or more processors 436 can be similar to the processor(s) 420 and the memory 438 can be similar to the memory 422. However, in some examples, the processor(s) 436 and the memory 438 may comprise different hardware than the processor(s) 420 and the memory 422 for additional redundancy.

In some examples, the memory 438 can comprise a localization component 440, a perception/prediction component 442, a planning component 444, and one or more system controllers 446.

In some examples, the localization component 440 may receive sensor data from the sensor(s) 406 to determine one or more of a position and/or orientation (together a pose) of the autonomous vehicle 402. Here, the position and/or orientation may be relative to point(s) and/or object(s) in an environment in which the autonomous vehicle 402 is located. In examples, the orientation may include an indication of a yaw, roll, and/or pitch of the autonomous vehicle 402 relative to a reference plane and/or relative to point(s) and/or object(s). In examples, the localization component 440 may perform less processing than the localization component 424 of the first computing device(s) 404 (e.g., higher-level localization). For instance, the localization component 440 may not determine a pose of the autonomous vehicle 402 relative to a map, but merely determine a pose of the autonomous vehicle 402 relative to objects and/or surfaces that are detected around the autonomous vehicle 402 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 442 can include functionality to detect, identify, classify, and/or track object(s) represented in sensor data. For example, the perception/prediction component 442 can perform the clustering operations and operations to estimate or determine a height associated with objects, as discussed herein.

In some examples, the perception/prediction component 442 may comprise an M-estimator, but may lack an object classifier such as, for example, a neural network, decision tree, and/or the like for classifying objects. In additional or alternate examples, the perception/prediction component 442 may comprise an ML model of any type, configured to disambiguate classifications of objects. By contrast, the perception component 426 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 442 (and/or 426) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 442 may also process the input data to determine one or more predicted trajectories for an object. For example, based on a current position of an object and a velocity of the object over a period of a few seconds, the perception/prediction component 442 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 444 can include functionality to receive a trajectory from the planning component 430 to validate that the trajectory is free of collisions and/or is within safety margins. In some examples, the planning component 444 can generate a safe stop trajectory (e.g., a trajectory to stop the vehicle 402 with a "comfortable" deacceleration (e.g., less than maximum deceleration)) and in some examples the planning component 444 can generate an emergency stop trajectory (e.g., maximum deceleration with or without steering inputs).

In some examples, the system controller(s) 446 can include functionality to control safety critical components (e.g., steering, braking, motors, etc.) of the vehicle. In this manner, the second computing device(s) 418 can provide redundancy and/or an additional hardware and software layer for vehicle safety.

The vehicle 402 can connect to computing device(s) 448 via the network 416 and can include one or more processors 450 and memory 452 communicatively coupled with the one or more processors 450. In at least one instance, the one or more processors 450 can be similar to the processor(s) 420 and the memory 452 can be similar to the memory 422. In the illustrated example, the memory 452 of the computing device(s) 448 stores a component(s) 454, which may correspond to any of the components discussed herein.

The processor(s) 420, 436, and/or 450 can be any suitable processor capable of executing instructions to process data and perform operations as described herein. By way of example and not limitation, the processor(s) 420, 436, and/or 450 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 422, 438, and/or 452 are examples of non-transitory computer-readable media. The memory 422, 438, and/or 452 can store an operating system and one or more software applications, instructions, programs, and/or data to implement the methods described herein and the functions attributed to the various systems. In various implementations, the memory 422, 438, and/or 452 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 422, 438, and/or 452 can be implemented as a neural network. In some examples, the components in the memory 422, 438, and/or 452 may not include machine learning algorithms (or may include simplified or verifiable machine learned algorithms) to reduce complexity and to be verified and/or certified from a safety standpoint.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
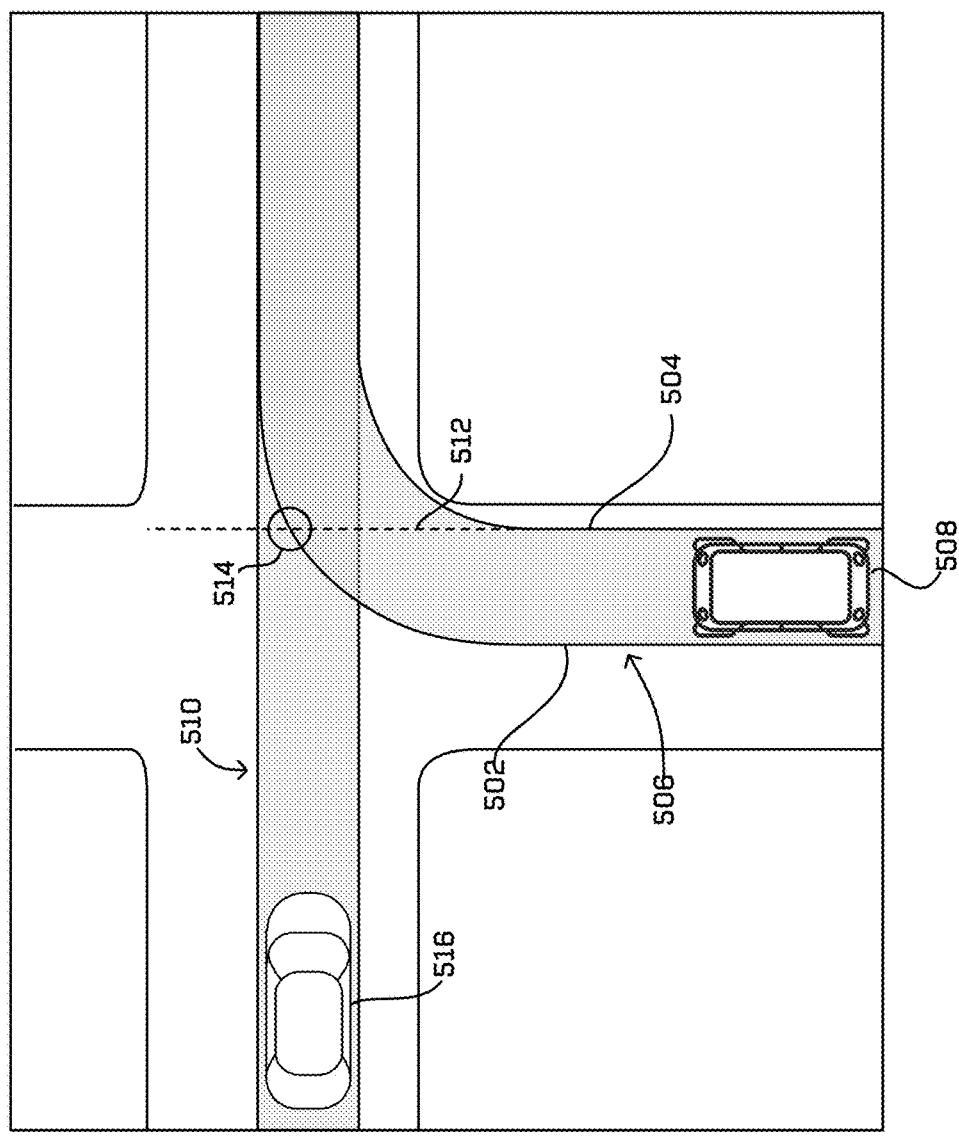
FIG. 5 depicts an environment including a boundary determined based on a vehicle trajectory, and a safety area determined based on a line associated with the boundary, in accordance with examples of the disclosure.

FIG. 5 depicts an environment 500 including a boundary determined based on a vehicle trajectory, and a safety area determined based on a line associated with the boundary, in accordance with examples of the disclosure.

In some examples, the environment 500 can include a first boundary (e.g., a boundary 502) and a second boundary (e.g., a boundary 504) associated with a first safety area (e.g., safety area 506). The safety area 506 can be determined based on a trajectory associated with a vehicle 508. A second safety area (e.g., safety area 510) can be determined based on a line 512 associated with the boundary 504. An intersection 514 between the boundary 502 and the line 512 associated with the boundary 504 associated with the safety area 506 can be determined. The safety area 506 can be determined, based on the intersection 514. In some examples, the intersection 514 can be associated with a turn in the environment meeting or exceeding a threshold turning angle. The safety area 510 can be utilized to filter, as filtered sensor data, sensor data associated with the safety area 510. The safety area 510 and the filtered sensor data can be utilized to determine an object 516 associated with the safety area 510. A width of the safety area 510 can be determined to include one or more of all intersecting lanes and/or other areas from which one or more objects may enter a lane associated with a trajectory of the vehicle 508. In some examples, a maximum width of the safety area 510 can be associated with a width of an intersecting lane perpendicular from a lane in which the vehicle 508 is currently situated. However, the maximum width is not limited as such and can be associated with a width that is less than, or greater than, the width of the intersecting lane.

Therefore, and as described herein, a second safety area can be determined to more easily determine whether an object is approaching a vehicle as the vehicle enters, or is performing, a turn. The object can be determined based on the second safety area, to avoid a potential collision that may otherwise occur due to missing information associated with the environment. By determining the second safety area based on the vehicle approaching an intersection or preparing to turn, a size of an environment that is being considered for planning purposes can be increased. A width of the second safety area can be determined to include one or more of all intersecting lanes and/or other areas from which one or more objects may enter a lane associated with a trajectory of the vehicle. In some examples, a maximum width of the second safety area can be associated with a width of an intersecting lane perpendicular from a lane in which the vehicle is currently situated. However, the maximum width is not limited as such and can be associated with a width that is less than, or greater than, the width of the intersecting lane.

Figure 6:
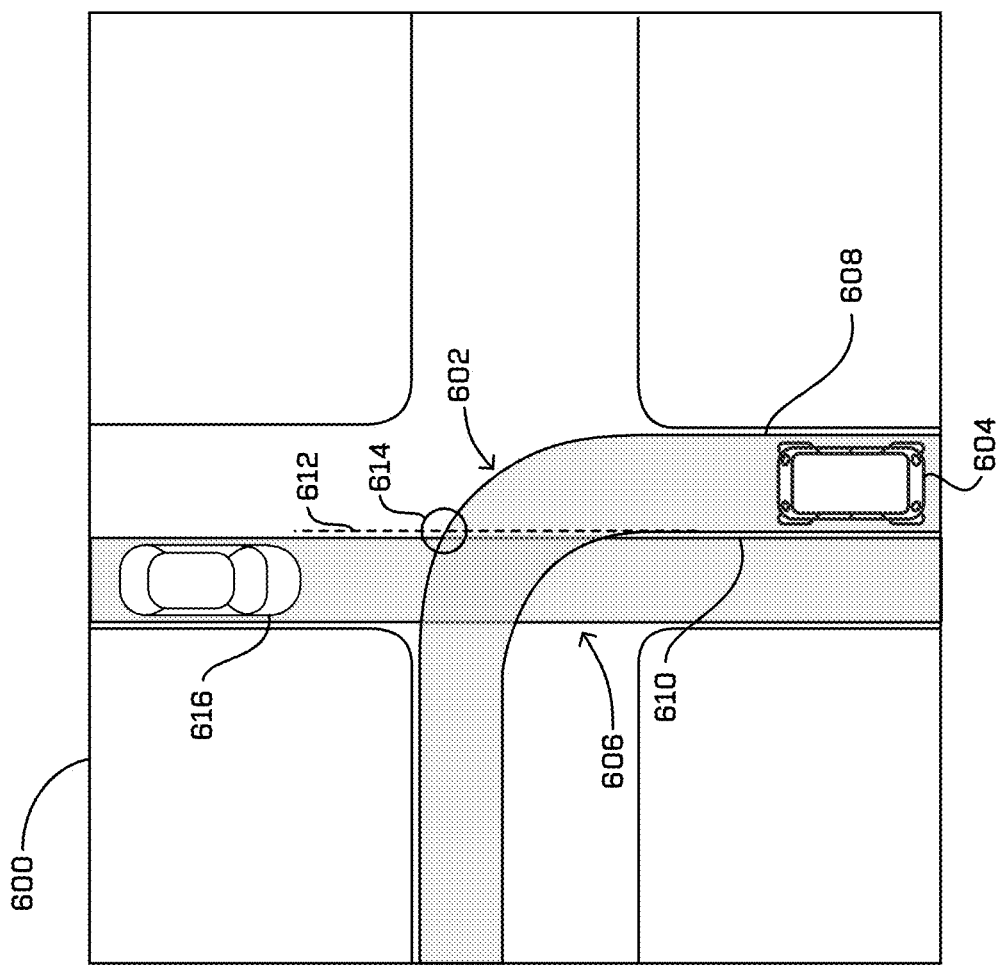
FIG. 6 depicts an environment including a safety area determined based on a vehicle trajectory including a left turn, in accordance with examples of the disclosure.

FIG. 6 depicts an environment 600 including a safety area determined based on a vehicle trajectory including a left turn, in accordance with examples of the disclosure.

In some examples, the environment 600 can include a first safety area (e.g., a safety area 602). The safety area 602 can be determined based on a trajectory associated with vehicle 604 including turn (e.g., a left turn). In some examples, the safety area 602 can be determined based at least in part on a width and/or length of the vehicle 110, a current velocity of the vehicle 604 and/or a velocity associated with the trajectory, and the like. A width of each portion of the safety area 602 can be a same width. The safety area 602 can be determined to be associated with a left turn based on the trajectory being associated with the left turn.

In some examples, a second safety area (e.g., a safety area 606) can be determined based on the trajectory. The safety area 606 can be determined based on the trajectory being associated with the turn (e.g., the left turn). In some examples, the safety area 606 can be determined based at least in part on a portion of the safety area 602 being associated with the vehicle 604 being controlled to turn. In some examples, the safety area 606 can be determined based on the turn (e.g., a turning angle associated with the turn) in the environment meeting or exceeding a threshold turning angle. The safety area 602 can be associated with a first boundary (e.g., a boundary 608) and a second boundary (e.g., a boundary 610). The safety area 606 can be determined based on a line 612 associated with the boundary 610. An intersection 614 between the boundary 608 and the line 612 associated with the safety area 602 can be determined. The safety area 606 can be determined, based on the intersection 614. In some examples, the intersection 614 can be associated with a turn in the environment meeting or exceeding a threshold turning angle. The safety area 606 can be utilized to filter, as filtered sensor data, sensor data associated with the safety area 606. The safety area 606 and the filtered sensor data can be utilized to determine an object 616 associated with the safety area 606. A width of the safety area 606 can be determined to include one or more of all adjacent and/or oncoming lanes, and/or other areas from which one or more objects may enter a lane associated with a trajectory of the vehicle. In some examples, a maximum width of the safety area 606 can be associated with a width of an oncoming lane proximate a lane in which the vehicle is currently situated. However, the maximum width is not limited as such and can be associated with a width that is less than, or greater than, the width of the oncoming lane.

In some examples, the safety area 606 can be adjacent to, and substantially parallel to, the safety area 602, based on the safety area 602 being associated with the left turn. In some examples, the safety area 606 can be spaced apart from the vehicle 604. For example, a distance between the safety area 606 and the vehicle 604 can be equal to, or greater than, a threshold distance (e.g., 10 cm, 1 meter, 3 meters, etc.). In other examples, the safety area 606 can abut (e.g., touch) the vehicle 604. In other examples, the safety area 606 can be spaced apart from (e.g., to not abut) the vehicle 604.

In some examples, the sensor data received by the vehicle 604 can be utilized to determine an object 616 in a closest lane adjacent to the vehicle, based on the safety area 606 being associated with (e.g., overlapping) the closest lane. In some examples, the sensor data received by the vehicle 604 can be utilized to determine the object 616 in a lane adjacent to the closest lane, or a lane separated by one or more lanes from the closest lane. In some examples, the sensor data received by the vehicle 604 can be utilized to determine the object 616 in one or more lanes, including the closest lane, the lane adjacent to the closest lane, and/or the lane separated by one or more lanes from the closest lane.

Therefore, and as described herein, a first safety area can be determined, as well as a second safety area being determined based on the vehicle making a left turn. The second safety area can be parallel to the first safety area, to more easily determine whether an oncoming vehicle object is approaching. Although the features described above with respect to FIG. 6 are related to the vehicle turning left, they are not limited as such. The features can be utilized with any other type of turn, such as the vehicle entering the oncoming lane to go around a double parked vehicle. The second safety area can also be used to determine whether an object is approaching from behind, on a one way road. The vehicle can be controlled to decelerate to slower velocity, to decelerate to a stop, to accelerate, and/or or to take another action (e.g., turn) to decrease a likelihood of a potential collision with the object. A width of the second safety area can be determined to include one or more of all adjacent and/or oncoming lanes, and/or other areas from which one or more objects may enter a lane associated with a trajectory of the vehicle. In some examples, a maximum width of the second safety area can be associated with a width of an oncoming lane proximate a lane in which the vehicle is currently situated. However, the maximum width is not limited as such and can be associated with a width that is less than, or greater than, the width of the oncoming lane. In some examples, a length of the second safety area can be a fixed distance (e.g., 10 m, 50 m, 150 m, 200 m, etc.). In some examples, the length can be based on a speed of the vehicle 604, a shape of the first safety area, and the like.

Figure 7:
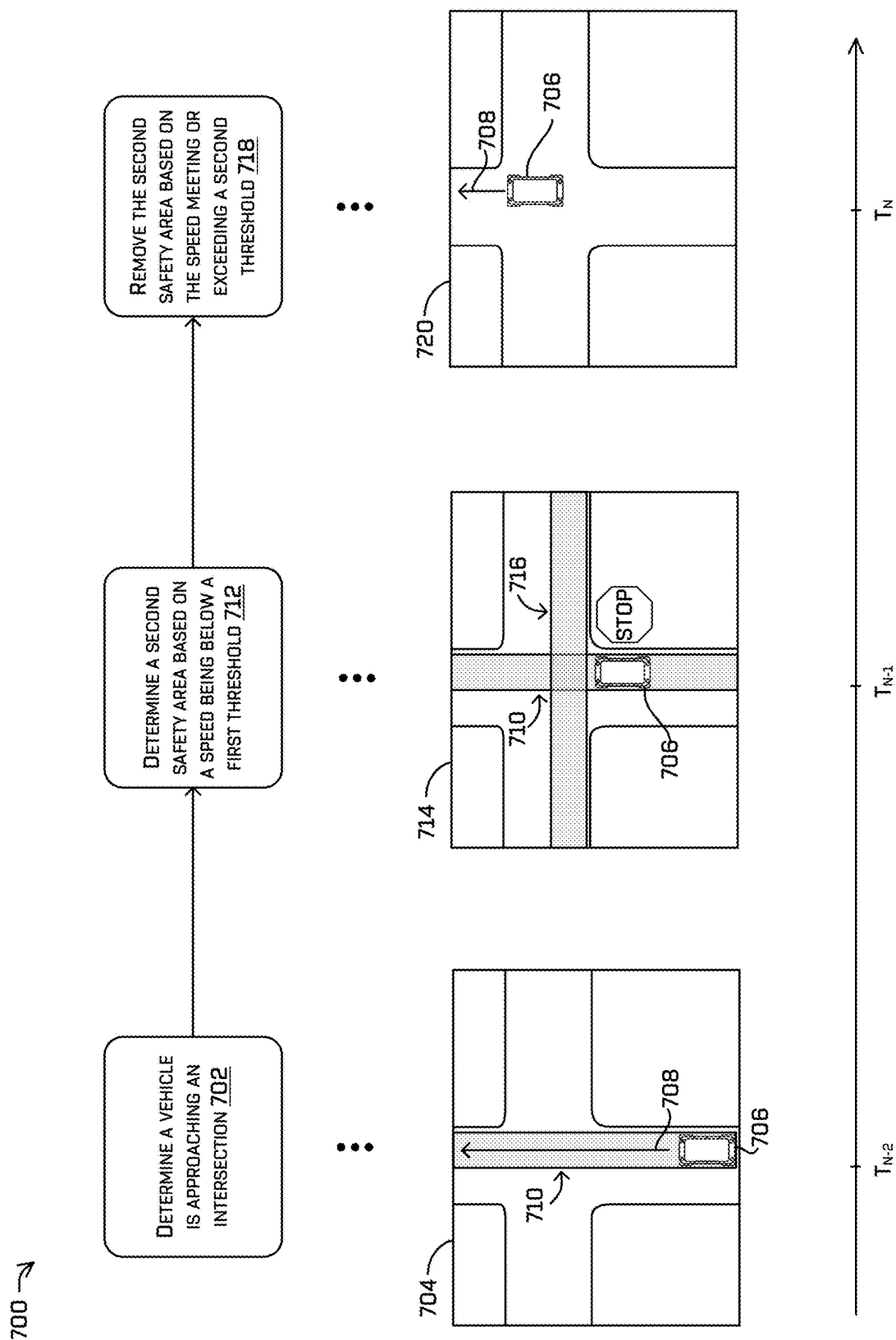
FIG. 7 is a pictorial flow diagram of an example process for determining a safety area based on a vehicle being stopped, in accordance with examples of the disclosure.

FIG. 7 is a pictorial flow diagram of an example process 700 for determining a safety area based on a vehicle being stopped, in accordance with examples of the disclosure An operation 702 can include determining a vehicle is approaching an intersection. In some examples, information associated with an environment through which the vehicle is travelling and/or the vehicle can be determined. The information can be utilized to determine whether the vehicle is approaching the intersection. For example, sensor data can be received by the vehicle and analyzed to identify an upcoming intersection. A first safety area can be determined based on a trajectory associated with the vehicle. The first safety area can be determined to be associated with the trajectory including no turns associated with the vehicle.

An example 704 illustrates an environment including a vehicle 706 approaching an intersection. In some examples, the vehicle 706 can be associated with a trajectory 708. A first safety area (e.g., a safety area 710) can be determined based on the trajectory 708 associated with 706 vehicle travelling through an environment. The safety area 710 can be determined to be associated with the trajectory 708 including no turns associated with the vehicle.

An operation 712 can include determining a second safety area based on a vehicle being stopped. In some examples, the second safety area can be determined based on a distance between the vehicle and an intersection falling below a threshold distance and/or or based on a velocity of the vehicle falling below a threshold velocity.

An example 714 illustrates the vehicle 706 being slowed to a stop at an intersection, based on a stop sign. In some examples, a second safety area (e.g., a safety area 716) can be determined based on a distance between the vehicle 706 and an intersection and/or or based on a velocity of the vehicle. The safety area 716 can be perpendicular to the safety area 710 that is in parallel with the trajectory 708, as described above.

An operation 718 can include removing a second safety area based on a velocity meeting or exceeding a threshold. The second safety area can be removed as the velocity of the vehicle increases, based on the vehicle being controlled to move forward through the intersection. The second safety area can be removed based on the velocity meeting or exceeding a threshold velocity.

An example 720 illustrates a second safety area (e.g., second safety area 716) being removed based on a velocity meeting or exceeding a threshold. The second safety area 716 can be removed as the velocity of the vehicle increases, based on the vehicle 706 being controlled to move forward through the intersection. The vehicle 706 can be controlled based on the trajectory 708. The safety area 716 can be removed based on the velocity meeting or exceeding a threshold velocity. The features described above with respect to FIG. 7 are not limited thereto and can be implemented in conjunction with any of the features described above with respect to any of FIGS. 1-3, 5, and 6.

Figure 8:
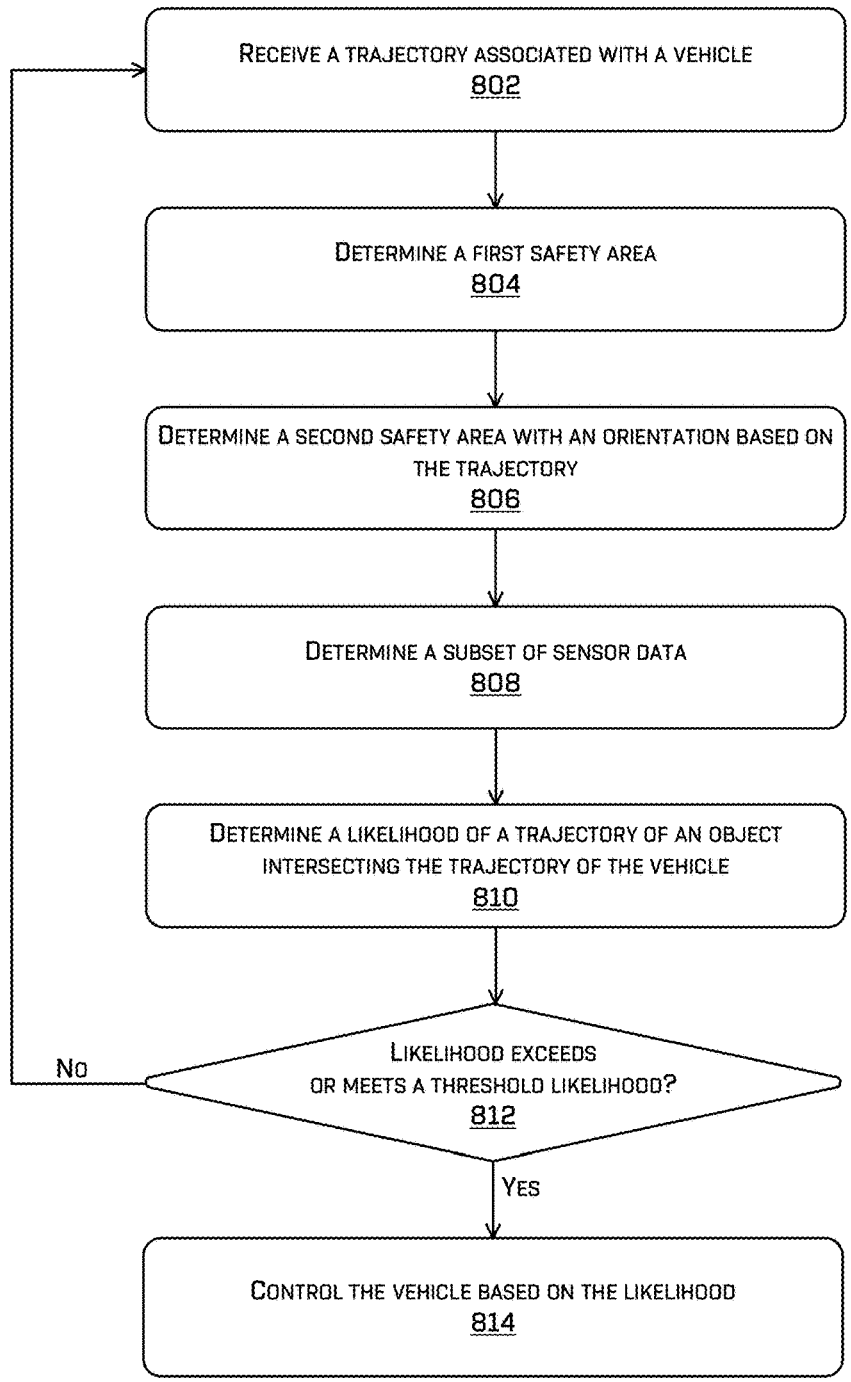
FIG. 8 is a flowchart depicting an example process for determining a safety area based on a vehicle trajectory including a turn, in accordance with examples of the disclosure.

FIG. 8 is a flowchart depicting an example process 800 for determining a safety area based on a vehicle trajectory including a turn, in accordance with examples of the disclosure.

At operation 802, the process can include receiving a trajectory associated with a vehicle. The trajectory can be associated with the vehicle moving through an environment.

At operation 804, the process can include determining a first safety area. The first safety area can be determined based on the trajectory. The first safety area can have a constant width.

At operation 806, the process can include determining a second safety area based on the trajectory, the second safety area differing from the first safety area. The second safety area can be perpendicular from the first safety area. The orientation of the second safety area can be determined based on a maneuver of the vehicle, a location of the vehicle, etc. The second safety area can be determined based on the trajectory being associated with a turn (e.g., a right turn or a left turn).

At operation 808, the process can include determining a subset of the sensor data associated with one or more of the first or second safety areas. The object can be determined based on the subset of the sensor data being received from one or more sensors of the vehicle. For example, the sensor data can include data from multiple types of sensors on the vehicle, such as LIDAR sensors, RADAR sensors, image sensors, depth sensors (time of flight, structured light, etc.), and the like. The subset of the sensor data can be output by one or more machine-learning models, Bayesian filters (e.g., Kalman filters), graphics processing unit(s) (GPU(s)), and/or the like, based on input of the sensor data.

At operation 812, the process can include determining whether the likelihood meets or exceeds a threshold likelihood. If no, the process can return to operation 802. If yes, the process can continue to operation 812.

At operation 814, if the process can include controlling the vehicle based on the likelihood. In some examples, the vehicle can be controlled to decelerate (e.g., slow down) and/or to stop. In some examples, the vehicle can be controlled to accelerate. An option determined to control the vehicle to accelerate or decelerate can be based on the predicted collision likelihood associated with the option being less than for the other option.

Figure 9:
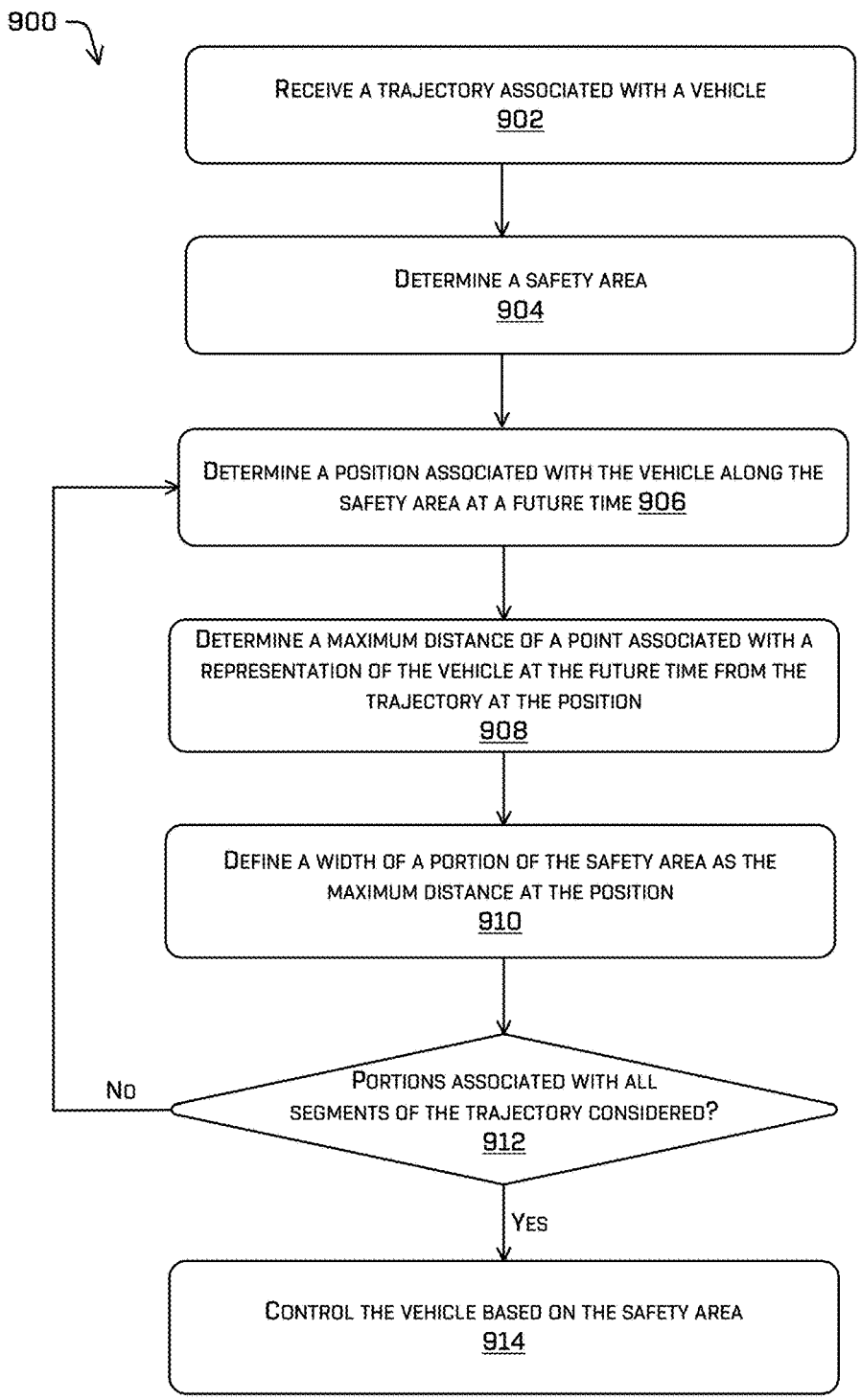
FIG. 9 is a flowchart depicting an example process for determining a width of a portion of a safety area based on an orientation of a bounding box associated with a vehicle, in accordance with examples of the disclosure.

FIG. 9 is a flowchart depicting an example process 900 for determining a width of a portion of a safety area based on an orientation of a bounding box associated with a vehicle, in accordance with examples of the disclosure.

At operation 902, the process can include receiving a trajectory associated with a vehicle. The trajectory can be associated with a vehicle and can be discretized.

At operation 904, the process can include determining a safety area, based on the trajectory. A plurality of segments associated with the safety area can be determined. A segment of the plurality of segments can extend a first distance substantially perpendicularly from the trajectory.

At operation 906, the process can include determining a position associated with the vehicle along the safety area at a future time. The position can be associated with a bounding box representing the vehicle at the future time.

At operation 908, the process can include determining a maximum distance of a point associated with a representation of the vehicle at the future time from the trajectory at the position. The point of the representation of the vehicle can be associated with a corner of the bounding box.

At operation 910, the process can include defining a width of a portion of the safety area as the maximum distance at the position. The width of the portion can be set as the first distance based on the first distance meeting or exceeding the second distance. By setting the width to be the first distance, the safety area can be increased to include the first point. Otherwise, the width of the portion can be set as the second distance, based on the first distance not meeting or exceeding the second distance.

At operation 912, the process can include determining whether portions of the safety area associated with all segments of the trajectory have been considered. If yes, the process can continue to operation 914. If no, the process can return to operation 906 to determine a first distance and a second distance associated with a portion of the safety area associated with a next segment of the trajectory.

At operation 914, the process can include controlling the vehicle based on the safety area. The vehicle can be controlled based on the width of the portion of the safety area being set as the first distance.

Example Clauses

A: A system comprising: one or more processors; and one or more computer-readable media storing instructions executable by the one or more processors, wherein the instructions, when executed, cause the system to perform operations comprising: receiving a trajectory associated with a vehicle traversing through an environment; determining a first safety area for the vehicle based on the trajectory; determining a second safety area based on the trajectory; receiving, from a sensor, sensor data associated with an environment through which the vehicle is traveling; determining a subset of the sensor data associated with the first safety area and the second safety area; detecting an object represented in the subset of the sensor data; determining, based at least in part on the subset of the sensor data, a likelihood that the object will intersect with the trajectory; determining a modified acceleration profile associated with the vehicle based on the likelihood; and controlling the vehicle based on the modified acceleration profile.

B: The system of paragraph A, wherein: the trajectory comprises traversing through an intersection; and determining the second safety area is based at least in part on portion of the environment substantially perpendicular to the trajectory.

C: The system of paragraph A or B, wherein the trajectory comprises a left turn, and wherein the second safety area comprises a region of the environment proximate a lane in which the vehicle is currently located.

D: The system of any of paragraphs A-C, wherein the second safety area is substantially perpendicular to the first safety area.

E: The system of any of paragraphs A-D, wherein determining an orientation of the second safety area is based at least in part on a line tangent to a point associated with the first safety area.

F: A method comprising: receiving a trajectory associated with a vehicle; determining a first safety area based at least in part on the trajectory; determining a second safety area based at least in part on the trajectory, the second safety area differing from the first safety area; determining a subset of sensor data associated with one or more of the first or second safety areas; determining a likelihood of a trajectory of an object represented in the subset of the sensor data intersecting the trajectory of the vehicle; and controlling the vehicle based at least in part on the likelihood.

G: The method of paragraph F, wherein controlling the vehicle comprises: determining a modified acceleration profile associated with the vehicle based at least in part on the trajectory of the object; and controlling the vehicle based at least in part on the modified acceleration profile.

H: The method of paragraph F or G, wherein controlling the vehicle further comprises: controlling the vehicle to decelerate to a stop based at least in part on the likelihood meeting or exceeding a threshold likelihood.

I: The method of any of paragraphs F-H, wherein a width of a portion of the first safety area is expanded based at least in part on a representation of the vehicle at a position along the first safety area at a future time.

J: The method of any of paragraphs F-I, wherein determining the second safety area further comprises: determining a first boundary associated with the first safety area; determining an intersection between the first boundary and a line associated with a second boundary associated with the first safety area, based at least in part on the trajectory; and determining the second safety area based on the intersection.

K: The method of any of paragraphs F-J, wherein the second safety area is substantially perpendicular to the first safety area.

L: The method of any of paragraphs F-K, wherein a first width of the first safety area is associated with a width of a lane in which the vehicle is currently situated, and a second width of the second safety area is associated with a width of an oncoming lane proximate the lane in which the vehicle is currently situated.

M: The method of any of paragraphs F-L, wherein determining the second safety area further comprises: determining the trajectory is associated with a left turn; and determining, as the second safety area, a portion of an environment associated with an oncoming lane proximate a lane in which the vehicle is currently situated.

N: The method of any of paragraphs F-M, wherein determining the second safety area further comprises: determining the second safety area based at least in part on a velocity of the vehicle being below a threshold velocity.

O: The method of any of paragraphs F-N, wherein determining the second safety area is further based at least in part on a point associated with the vehicle.

P: One or more non-transitory computer-readable media storing instructions that, when executed, cause one or more processors to perform operations comprising: receiving a trajectory associated with a vehicle; determining a first safety area based at least in part on the trajectory; determining a second safety area based at least in part on the trajectory, the second safety area differing from the first safety area; determining a subset of sensor data associated with one or more of the first or second safety areas; determining a likelihood of a trajectory of an object represented in the subset of the sensor data intersecting the trajectory of the vehicle; and controlling the vehicle based at least in part on the likelihood.

Q: The one or more non-transitory computer-readable media of paragraph P, wherein controlling the vehicle comprises: determining a modified acceleration profile associated with the vehicle based at least in part on the trajectory of the object; and controlling the vehicle based at least in part on the modified acceleration profile.

R: The one or more non-transitory computer-readable media of paragraph P or Q, wherein controlling the vehicle further comprises: controlling the vehicle to decelerate to a stop based at least in part on the likelihood meeting or exceeding a threshold likelihood.

S: The one or more non-transitory computer-readable media of any of paragraphs P-R, wherein a width of a portion of the first safety area is expanded based at least in part on a representation of the vehicle at a position along the first safety area at a future time.

T: The one or more non-transitory computer-readable media of any of paragraphs P-S, wherein determining the second safety area further comprises: determining a first boundary associated with the first safety area; determining an intersection between the first boundary and a line associated with a second boundary associated with the first safety area, based at least in part on the trajectory; and determining the second safety area based on the intersection.

U: A system comprising: one or more processors; and one or more computer-readable media storing instructions executable by the one or more processors, wherein the instructions, when executed, cause the system to perform operations comprising: receiving a trajectory associated with a vehicle; determining, based on at least in part on the trajectory, a safety area; determining a plurality of segments associated with the safety area, a segment of the plurality of segments extending a first distance substantially perpendicularly from the trajectory; determining a position of a bounding box along the trajectory, the bounding box representing the vehicle at a future time; determining a second distance between a point of the bounding box and a closest point on the trajectory; determining that the second distance meets or exceeds the first distance; determining, based on the second distance exceeding the first distance, a modified safety area; and controlling the vehicle based on the modified safety area.

V: The system of paragraph U, wherein: the position of the bounding box is based at least in part on a simulation of the vehicle traversing along the trajectory at the future time; and the point of the bounding box is associated with a corner of the bounding box.

W: The system of paragraph U or V, the operations further comprising: receiving sensor data from a sensor associated with the vehicle; determining, based at least in part on the modified safety area, a subset of sensor data; detecting an object represented in the subset of sensor data; and determining a likelihood that the object will intersect the trajectory, wherein controlling the vehicle is further based at least in part on the likelihood.

X: The system of any of paragraphs U-W, wherein a width of the safety area is associated with a width of the vehicle.

Y: The system of any of paragraphs U-X, wherein a width of the modified safety area is associated with a width of a lane in which the vehicle is currently situated.

Z: A method comprising: receiving a trajectory associated with a vehicle; determining, based at least in part on the trajectory, a safety area associated with the vehicle; determining a position associated with the vehicle along the safety area at a future time; determining a maximum distance of a point associated with a representation of the vehicle at the future time from the trajectory at the position; defining a width of a portion of the safety area as the maximum distance at the position; and controlling the vehicle based at least in part on the safety area.

AA: The method of paragraph Z, further comprising: determining a plurality of segments associated with the trajectory, wherein the position is associated with a segment of the plurality of segments.

AB: The method of paragraph Z or AA, wherein: the position associated with the vehicle along the safety area is based at least in part on a simulation of the vehicle traversing along the trajectory at the future time; and the point is associated with a corner of a bounding box representing the vehicle.

AC: The method of any of paragraphs Z-AB, further comprising: receiving sensor data from a sensor associated with the vehicle; determining, based at least in part on a modified safety area comprising the portion of the safety area, a subset of the sensor data; detecting an object represented in the subset of the sensor data; and determining a likelihood that the object will intersect the trajectory, wherein controlling the vehicle is further based at least in part on the likelihood.

AD: The method of any of paragraphs Z-AC, wherein a maximum width of the safety area is associated with a width of the vehicle.

AE: The method of any of paragraphs Z-AD, wherein a maximum width of a modified safety area comprising the portion of the safety area is associated with a width of a lane in which the vehicle is currently situated.

AF: The method of any of paragraphs Z-AE, wherein the representation of the vehicle comprises a bounding box.

AG: The method of any of paragraphs Z-AF, further comprising. receiving sensor data; determining, based at least in part on the safety area, a subset of sensor data; detecting an object represented in the subset of the sensor data; and determining a likelihood that the object will intersect the trajectory, wherein controlling the vehicle is further based at least in part on the likelihood.

AH: The method of paragraph AG, wherein controlling the vehicle comprises modifying one or more of an acceleration or steering command to reduce the likelihood of intersection.

AI: The method of any of paragraphs Z-AH, further comprising: receiving sensor data from a sensor associated with the vehicle, wherein the sensor data comprises one or more of lidar data, camera data, radar data, ultrasonic data, or depth data.

AJ: One or more non-transitory computer-readable media storing instructions that, when executed, cause one or more processors to perform operations comprising: receiving a trajectory associated with a vehicle; determining, based at least in part on the trajectory, a safety area associated with the vehicle; determining a position associated with the vehicle along the safety area at a future time; determining a maximum distance of point associated with a representation of the vehicle at the future time from the trajectory at the position; defining a width of a portion of the safety area as the maximum distance at the position; and controlling the vehicle based at least in part on the safety area.

AK: The one or more non-transitory computer-readable media of paragraph AJ, the operations further comprising: determining a plurality of segments associated with the trajectory, and wherein the position is associated with a segment of the plurality of segments.

AL: The one or more non-transitory computer-readable media of paragraph AJ or AK, wherein: the position associated with the vehicle along the safety area is based at least in part on a simulation of the vehicle traversing along the trajectory at the future time; and the point is associated with a corner of a bounding box representing the vehicle.

AM: The one or more non-transitory computer-readable media of any of paragraphs AJ-AL, the operations further comprising: receiving sensor data from a sensor associated with the vehicle; determining, based at least in part on a modified safety area comprising the portion of the safety area, a subset of the sensor data; detecting an object represented in the subset of the sensor data; and determining a likelihood that the object will intersect the trajectory, wherein controlling the vehicle is further based at least in part on the likelihood.

AN: The one or more non-transitory computer-readable media of any of paragraphs AJ-AM, wherein a maximum width of the safety area is associated with a width of the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-AN can be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by the one or more proces- sors, wherein the instructions, when executed, cause the system to perform operations comprising:
  receiving a trajectory associated with a vehicle traversing through an environment, the vehicle having a first width;
  determining a first safety area for the vehicle based on the trajectory, the first safety area having a first portion and a second portion, the first portion of the first safety area having a second width determined based on the first width, the second portion of the first safety area having a third width that is expanded based at least in part on a representation of the vehicle at a position along the first safety area at a future time;
  determining, as a second safety area and based on the trajectory, an extension of the first portion of the first safety area that is aligned with an intersecting lane to a lane associated with the vehicle, wherein determining the extension comprises:
    extending a line tangent to the first portion of the first safety area, and
    determining, as the second safety area being aligned with the line tangent and based on the trajectory, the extension of the first portion of the first safety area that is aligned with the intersecting lane;
  receiving, from a sensor, sensor data associated with the environment;
  determining that an object with which the vehicle is merging is represented in a subset of the sensor data associated with the first safety area and the second safety area, the second safety area having a fourth width determined based on the first width, the fourth width of the second safety area being determined independently of the second width of the first safety area;
  determining a modified acceleration profile associated with the vehicle based on a likelihood that the object will intersect with the trajectory; and
  controlling the vehicle to decelerate to a stop based on the modified acceleration profile, and on the likelihood meeting or exceeding a threshold likelihood.

2. The system of claim 1, wherein:
the trajectory comprises traversing through an intersection; and
determining the second safety area is based at least in part on a third portion of the environment perpendicular to the trajectory.

3. The system of claim 1, wherein the trajectory comprises a right turn, and
wherein the second safety area comprises a region of the environment perpendicular to the lane.

4. The system of claim 1, wherein the second safety area is perpendicular to the first portion of the first safety area.

5. The system of claim 1, wherein determining an orientation of the second safety area is based at least in part on the line tangent, and
wherein determining that the object is represented in the subset of the sensor data comprises determining, in response to the determining of the second safety area, that the object is represented in the subset of the sensor data.

6. The system of claim 1, wherein:
a third portion of the first safety area has a fifth width; and
the fourth width of the second safety area is determined independently of the fifth width of the first safety area.

7. The system of claim 1, wherein:
the first safety area includes a straight portion as the first portion;
the first safety area is modified to include a curved portion as the second portion having the third width expanded to be a fifth width at a radius of the curved portion, the fifth width being different from the second width; and
the second safety area has a constant width as the third width.

8. The system of claim 1, wherein:
the first safety area is a type of safety area aligned with the trajectory;
the second safety area is a different type of safety area generated for object detection based at least in part on the first safety area; and
the second safety area is not aligned with the second portion of the first safety area in which the vehicle is located.

9. The system of claim 1, wherein:
the first safety area includes a straight portion as the first portion,
the second width is equal to the first width;
the first safety area includes a curved portion having the third width expanded to be a fifth width at a radius of the curved portion; and
the fourth width is a constant width that is different from the fifth width.

10. The system of claim 1, wherein the first safety area includes, at a current time that is previous to a point in time at which the vehicle encounters, as the second portion, a curved portion of the first safety area, the curved portion having a radius with a different width from the first portion of the first safety area that is a straight portion.

11. A method comprising:
  receiving a trajectory associated with a vehicle having a first width;
  determining a first safety area having a first portion and a second portion based at least in part on the trajectory, the first portion of the first safety area having a second width determined based at least in part on the first width, the second portion of the first safety area having a third width that is expanded based at least in part on a representation of the vehicle at a position along the first safety area at a future time;
  determining, as a second safety area and based at least in part on the trajectory, the second safety area, an extension of the first portion of the first safety area that is aligned with an intersecting lane to a lane associated with the vehicle, wherein determining the extension comprises:
    extending a line tangent to the first portion of the first safety area, and
    determining, as the second safety area being aligned with the line tangent and based on the trajectory, the extension of the first portion of the first safety area that is aligned with the intersecting lane;
  determining that an object with which the vehicle is merging is represented in a subset of sensor data associated with one or more of the first safety area or the second safety area, the second safety area having a fourth width determined based at least in part on the first width, the fourth width of the second safety area being determined independently of the second width of the first safety area;
  determining a likelihood that a trajectory of the object will intersect the trajectory of the vehicle; and controlling the vehicle to decelerate to a stop based at least in part on the likelihood meeting or exceeding a threshold likelihood.

12. The method of claim 11, wherein controlling the vehicle comprises:
   determining a modified acceleration profile associated with the vehicle based at least in part on the trajectory of the object; and
   controlling the vehicle based at least in part on the modified acceleration profile.

13. The method of claim 11, wherein determining the second safety area further comprises:
   determining a first boundary associated with the first safety area;
   determining an intersection between the first boundary and a line associated with a second boundary associated with the first safety area, based at least in part on the trajectory associated with the vehicle; and
   determining the second safety area based at least in part on the intersection.

14. The method of claim 11, wherein the second width of the first safety area is associated with a fifth width of the lane in which the vehicle is currently situated, and the fourth width of the second safety area is associated with a sixth width of the intersecting lane.

15. The method of claim 11, wherein determining the second safety area further comprises:
   determining the trajectory is associated with a right turn; and
   determining, as the second safety area, a third portion of an environment associated with the intersecting lane.

16. The method of claim 11, wherein determining the second safety area further comprises:
   determining the second safety area based at least in part on a velocity of the vehicle being below a threshold velocity.

17. The method of claim 11, wherein the subset of sensor data associated with the first safety area is based at least in part on filtering first sensor data associated with the first safety area.

18. One or more non-transitory computer-readable media storing instructions that, when executed, cause one or more processors to perform operations comprising:
   receiving a trajectory associated with a vehicle having a first width;
   determining a first safety area having a first portion and a second portion based at least in part on the trajectory, the first portion of the first safety area having a second width determined based at least in part on the first width, the second portion of the first safety area having a third width that is expanded based at least in part on a representation of the vehicle at a position along the first safety area at a future time;
   determining, as a second safety area and based at least in part on the trajectory, an extension of the first portion of the first safety area that is aligned with an intersecting lane to a lane associated with the vehicle, wherein determining the extension comprises:
      extending a line tangent to the first portion of the first safety area, and
      determining, as the second safety area being aligned with the line tangent and based on the trajectory, the extension of the first portion of the first safety area that is aligned with the intersecting lane;
   determining that an object with which the vehicle is merging is represented in a subset of sensor data associated with one or more of the first safety area or the second safety area, the second safety area having a fourth width determined based at least in part on the first width, the fourth width of the second safety area being determined independently of the second width of the first safety area;
   determining a likelihood that a trajectory of the object will intersect the trajectory of the vehicle; and
   controlling the vehicle to decelerate to a stop based at least in part on the likelihood meeting or exceeding a threshold likelihood.

19. The one or more non-transitory computer-readable media of claim 18, wherein determining the second safety area further comprises:
   determining a first boundary associated with the first safety area;
   determining an intersection between the first boundary and a line associated with a second boundary associated with the first safety area, based at least in part on the trajectory; and
   determining the second safety area based at least in part on the intersection.

\* \* \* \* \*